United States Patent [19]

Ohmstedt et al.

[11] 4,329,611
[45] May 11, 1982

[54] BRUSHHOLDER APPARATUS FOR DYNAMOELECTRIC MACHINE

[75] Inventors: Harry O. Ohmstedt, Saratoga Spring; William H. Ruth, Schenectady; Gerd E. Krulls, Delanson, all of N.Y.

[73] Assignee: General Electric Company, Schenectady, N.Y.

[21] Appl. No.: 47,441

[22] Filed: Jun. 11, 1979

Related U.S. Application Data

[63] Continuation of Ser. No. 853,259, Nov. 21, 1977, abandoned.

[51] Int. Cl.³ .............................................. H02K 9/28
[52] U.S. Cl. ...................................... 310/227; 310/62; 310/242; 310/245
[58] Field of Search ............... 310/239, 240, 241, 242, 310/244, 245, 246, 247, 249, 227, 62

[56] References Cited

U.S. PATENT DOCUMENTS

| | | | |
|---|---|---|---|
| 2,280,735 | 4/1942 | Weissinger | 310/245 |
| 2,849,631 | 8/1958 | Matz | 310/249 |
| 3,173,047 | 3/1965 | Matz | 310/249 |
| 3,432,708 | 3/1969 | Bissett | 310/239 |
| 3,523,288 | 8/1970 | Thompson | 310/245 |
| 3,710,478 | 1/1973 | Krulls | 310/239 |
| 3,784,855 | 1/1974 | Motegi | 310/227 |
| 3,864,803 | 2/1975 | Ohmstedt | 29/205 |
| 3,968,391 | 7/1976 | Blank | 310/240 |

Primary Examiner—R. Skudy
Attorney, Agent, or Firm—Ormand R. Austin; John F. Ahern

[57] ABSTRACT

Brushholder apparatus is disclosed for supporting electrically conductive brushes of a dynamoelectric machine in a manner facilitating improved cooling of the brushes and adjacent collector ring. The apparatus includes a brushholder assembly with a pair of legs to internally support a brush and may also include a casing arranged to retain several brushholder assemblies, provide an enclosure for properly directing cooling gas circulated by a fan, and furnish a common electrical link between brushholder assemblies and a source of electric current. An insulated handle is described which can be inserted into the brushholder assembly and manipulated to lock handle, brushholder assembly, and brush together as a unit to permit safe removal of the brushholder assembly and associated brush from the casing and installation of a new brush during operation of the machine.

6 Claims, 6 Drawing Figures

BRUSHHOLDER APPARATUS FOR DYNAMOELECTRIC MACHINE

This is a continuation of application Ser. No. 853,259, filed Nov. 21, 1977, now abandoned.

BACKGROUND OF THE INVENTION

This invention relates to electrically conductive brushes of a dynamoelectric machine and more particularly to apparatus which supports and manipulates brushes near a collector ring of a dynamoelectric machine.

As the power ratings of dynamoelectric machines have increased substantially in recent years, proper management of the large quantities of heat generated in current-carrying conductors of the machines has presented considerable challenge. The problem of avoiding overheating is particularly critical as the very large size of some components and the attendant difficulty of constructing and shipping certain units had made it desirable that increased ratings be achieved without further increases in size of certain components of the machine.

One part of the machine where increased current capacity is sought is the collector assembly, where higher ratings are desired without attendant increases in length or diameter of the dynamoelectric machine rotor. In this area, brushes of electrically conductive material such as graphite are typically used to transfer current from stationary portions of the machine to the rotating collector ring to furnish magnetizing power to the rotor field winding. Excess heat in this region can raise brush temperatures to high levels, causing rapid wearing of the brushes and necessitating their frequent replacement, and may also damage the collector ring.

Several devices to mount brushes in a dynamoelectric machine are shown in the prior art, including those described in the following patents assigned to the assignee of the present invention: U.S. Pat. Nos. 3,387,155 to Krulls; 3,432,708 to Bissett; 3,710,478 to Krulls et al; and 3,864,803 to Ohmstedt et al. Other brush assemblies are shown in U.S. Pat. Nos. 3,628,051 to Chigirinsky ulitsa Kuibysheva et al; 3,968,391 to Blank, and 3,983,432 to Rankin. Each of the patents cited above discloses apparatus permitting removal of brushes from the collector ring or rotating component of a dynamoelectric machine without shutdown of the machine. Also common to the disclosures of each of these patents is a box-like structure which contains and supports the brush to permit it to ride stably on the collector ring.

While these prior art devices allow a reduction in the labor involved in replacing worn brushes and avoidance of losses of power and time associated with stopping and re-starting the rotor of the machine, in certain applications the transfer of heat away from the brushes is impeded by the box-like structure these devices provide around the brush, which acts to shield a large portion of the brush from the surrounding gas, usually air. Although some machines, such as the turbine-generator whose excitation system is described in the paper "Experience With Alterrex Excitation For Large Turbine-Generators" by J. S. Bishop et al, presented in September 1974 at a Joint Power Conference of the Institute of Electrical and Electronics Engineers and American Society of Mechanical Engineers, incorporate fans to circulate air near the brushes and collector rings, such arrangements may be less efficient than desired, particularly as ratings are increased, since the fans must overcome the shielding effect of the brush boxes. As a result, excess power may be consumed in pumping air, or the brushes may operate at high temperatures and wear rapidly. Frequent inspection and replacement of the more than one hundred brushes of a typical large dynamoelectric machine can represent a significant maintenance expense.

Accordingly, it is an object of this invention to provide improved apparatus for supporting and manipulating an electrically conductive brush near a rotor of a dynamoelectric machine such that substantially all of the side surface area of the brush is exposed for unimpeded heat transfer away from the brush.

Another object of the invention is to provide brushholder apparatus wherein a brush is internally supported to improve heat transfer from brush surfaces and decrease brush wear.

A further object of this invention is to provide brushholder apparatus which includes a retainer to properly direct cooling gas near the brush and also includes means to permit safe removal and replacement of worn brushes without requiring shutdown of the dynamoelectric machine.

SUMMARY OF THE INVENTION

Apparatus is provided for supporting and manipulating an electrically conductive brush near the rotor of a dynamoelectric machine. In a preferred embodiment the invention includes a brushholder assembly having a pair of substantially parallel pins or legs adapted to fit into longitudinal bores in a brush and to support the brush as it rides on a collector ring of a dynamoelectric machine, thus leaving substantially all of the outer surface of the brush exposed for transfer of heat away from the brush. In a preferred embodiment a cylindrical casing concentric with the rotor furnishes support for the brushholder assembly as it protrudes inward toward the collector ring through an opening in the casing, provides a ventilation enclosure for properly directing the cooling gas circulated by a fan, and furnishes a common electrical link between several brushholder assemblies and a source of electrical current. An insulated detachable handle permits removal or insertion of the brushholder assembly without shutdown of the dynamoelectric machine, and a brush retaining lever provides positive retention of a brush by the brushholder assembly during these operations.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawings in which:

DETAILED DESCRIPTION OF THE INVENTION

Figure 1:
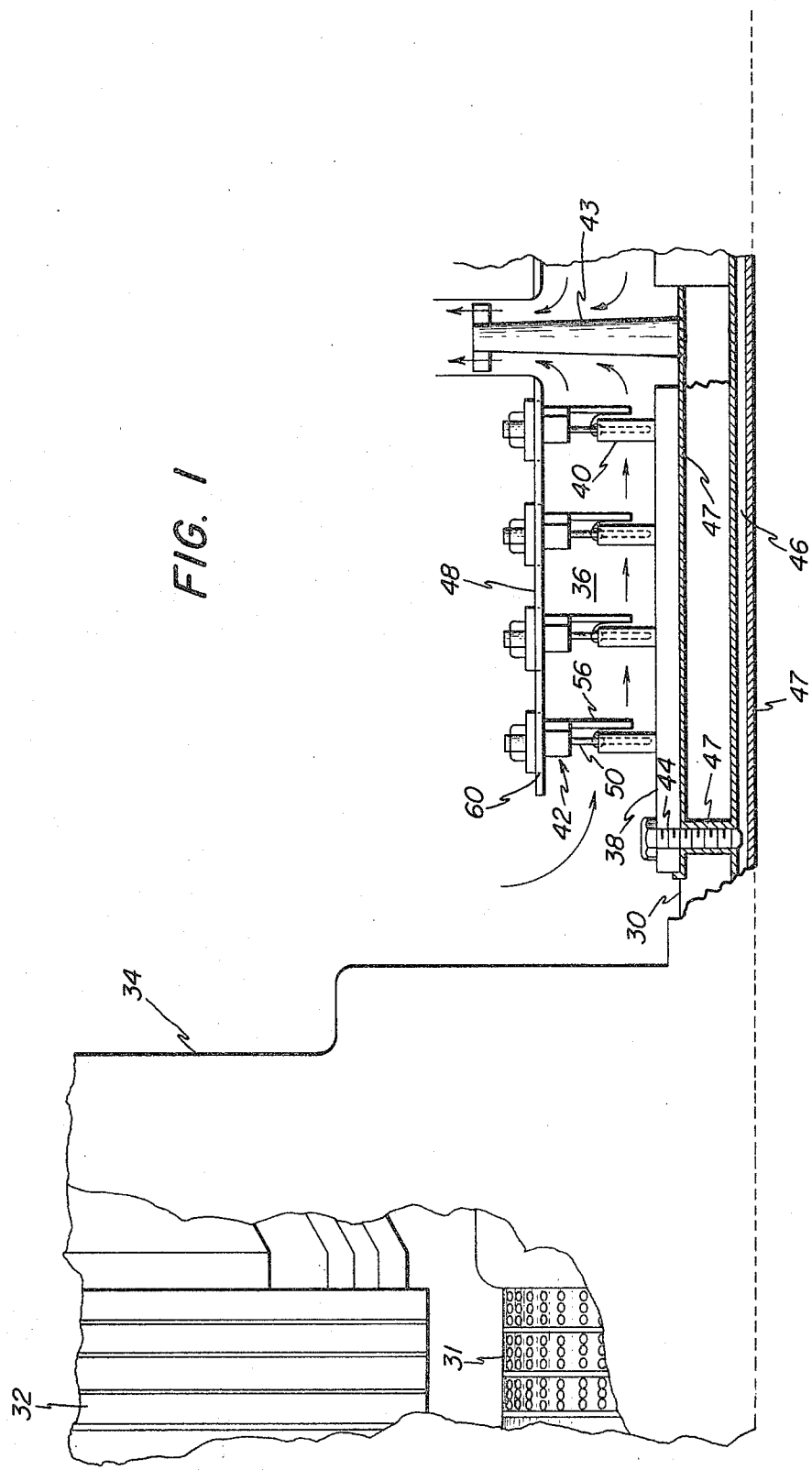
FIG. 1 is a side elevation view, with parts broken away to expose internal details, of a portion of a dynamoelectric machine showing a collector assembly and, in accordance with a preferred embodiment of the invention, several brushholder assemblies attached to a casing, with the brushholder assemblies supporting brushes near a collector ring of the machine.

FIG. 1 shows a portion of a dynamoelectric machine forming a typical operating environment for a preferred embodiment of the invention. In the arrangement illustrated, a rotor 30 including a field winding 31 is disposed for rotation within a laminated stator core 32 which in turn is enclosed by a gas-tight main housing 34. The rotor 30 extends beyond the main housing 34 and is disposed within a collector assembly indicated generally at 36, whose primary function is to transfer electric current from a source of excitation (not shown) to the rotating field winding 31. The collector assembly 36 includes a collector ring 38 attached to the outer periphery of the rotor 30, a plurality of electrically conductive brushes 40 each supported near or in contact with the collector ring 38 by a brush-holder assembly 42, and may include a fan such as radial flow fan 43 mounted on the rotor 30 for circulating cooling gas such as air near the brushes 40 and collector ring 38. As is known in the prior art, the collector ring 38 is electrically connected to the rotor field winding 31 of the dynamoelectric machine by means such as a radially extending terminal stud 44 and a generally axially disposed connection bar 46, both suitably insulated from the rotor 30 by insulating rings 47. It should be understood that a typical dynamoelectric machine includes another collector assembly (not shown) on the other side of fan 43 to provide a return path for electric current flowing from the field winding 31 to the source of excitation (not shown). Also it should be noted that each row of brushes shown in FIG. 1 will ordinarily include several brushes spaced around the collector ring 38 and that the number of rows of brushes will depend on current rating of the collector, brush size, and other factors.

In a preferred arrangement of the present invention as shown in FIG. 1, the stationary conductor or bus ring which provides a common electrical link between brushholder assemblies 42 and the source of excitation comprises a casing 48 preferably cylindrical and concentric with the rotor 30. The casing 48 also rigidly supports the brushholder assemblies 42 and in addition provides a flow path for cooling gas circulated by the fan 43 so that high gas velocities and heat transfer rates can be achieved near the brushes 40 and collector ring 38.

Figure 2:
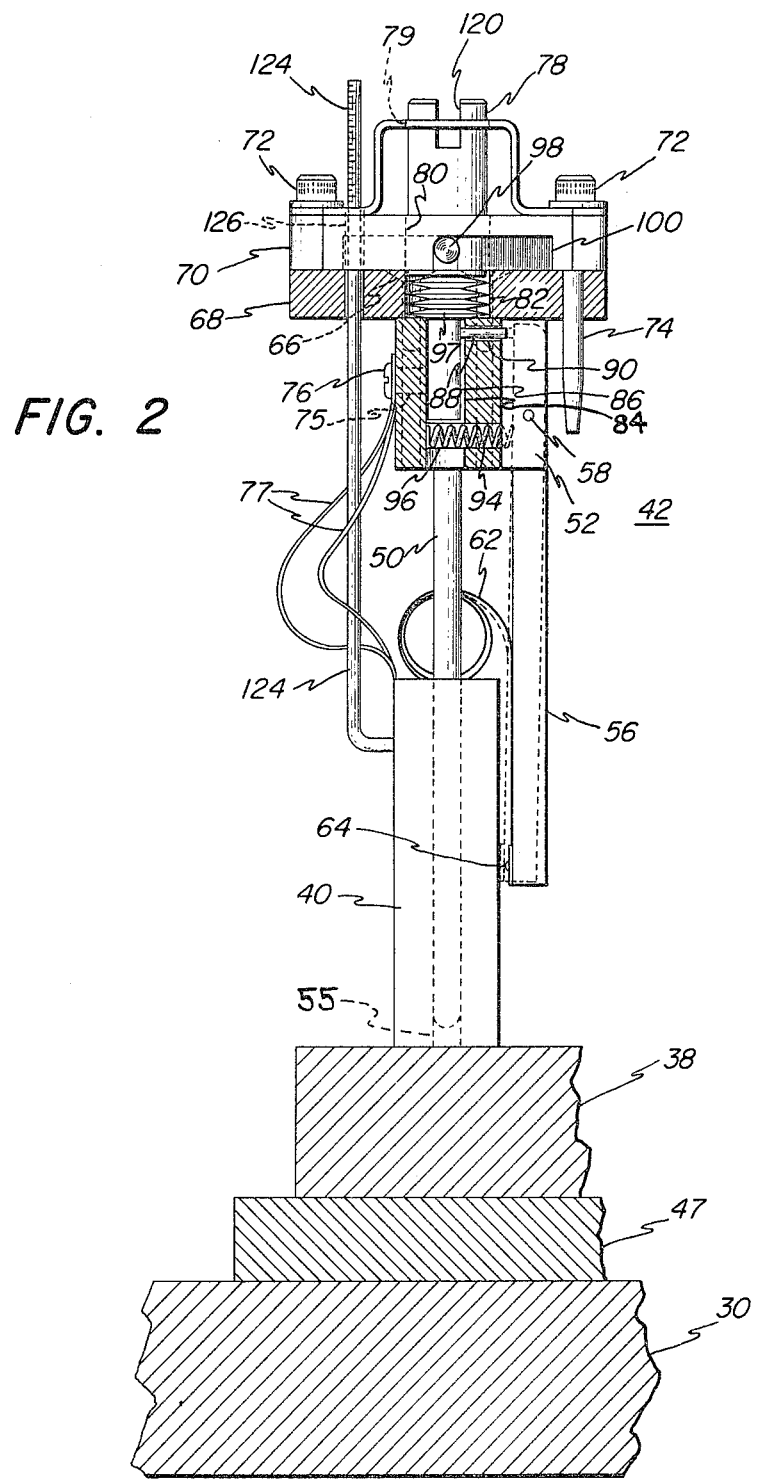
FIG. 2 is a side elevation view of a brushholder assembly of the present invention and an internally supported brush positioned near a collector ring, and also showing in broken lines the brush retaining lever in position engaging the side of a brush.
Figure 3:
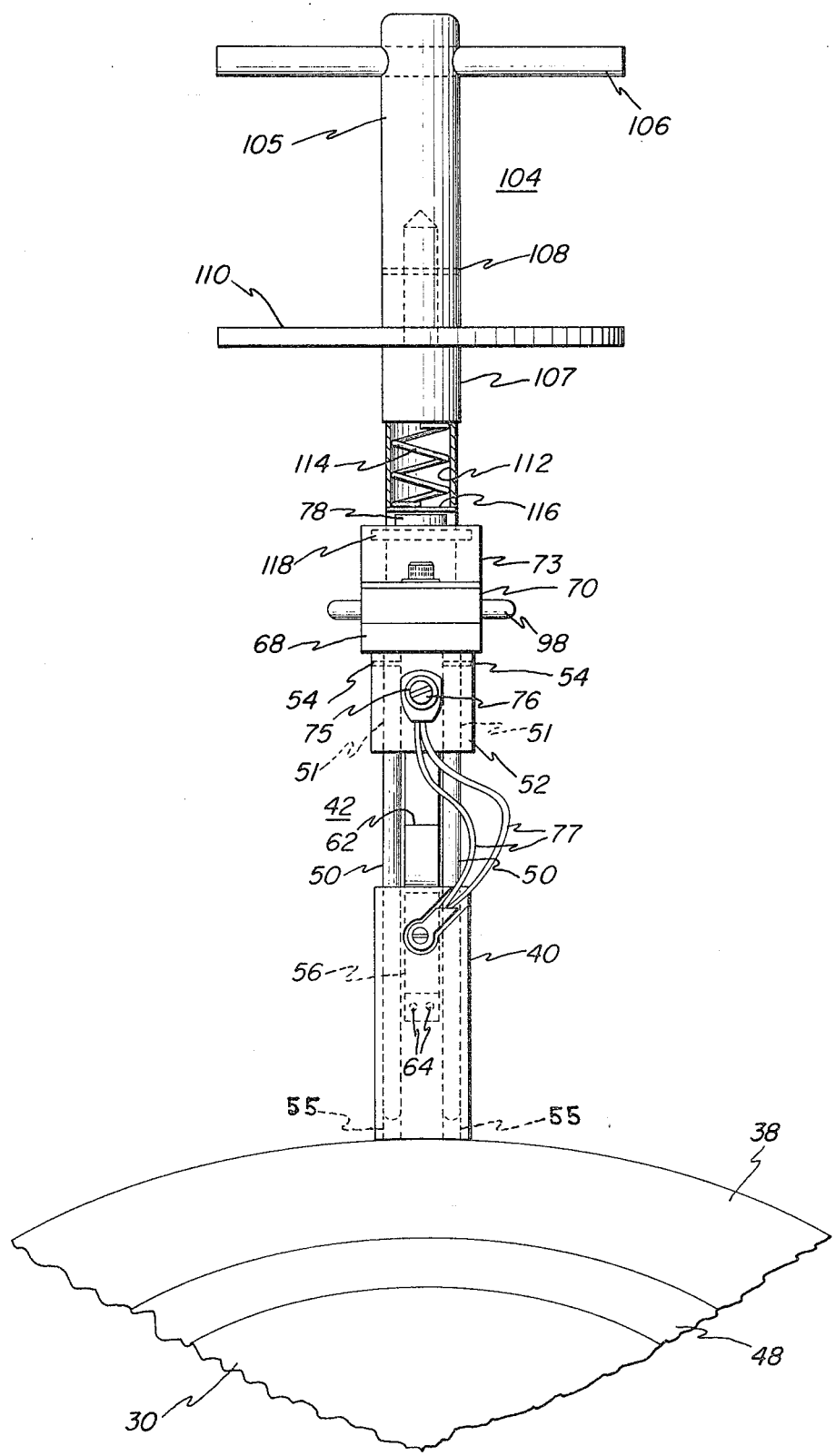
FIG. 3 is a front elevation view of the brushholder assembly and associated brush and the removable insulated handle used to insert the assembly and brush into, and remove them from, the casing.
Figure 4:
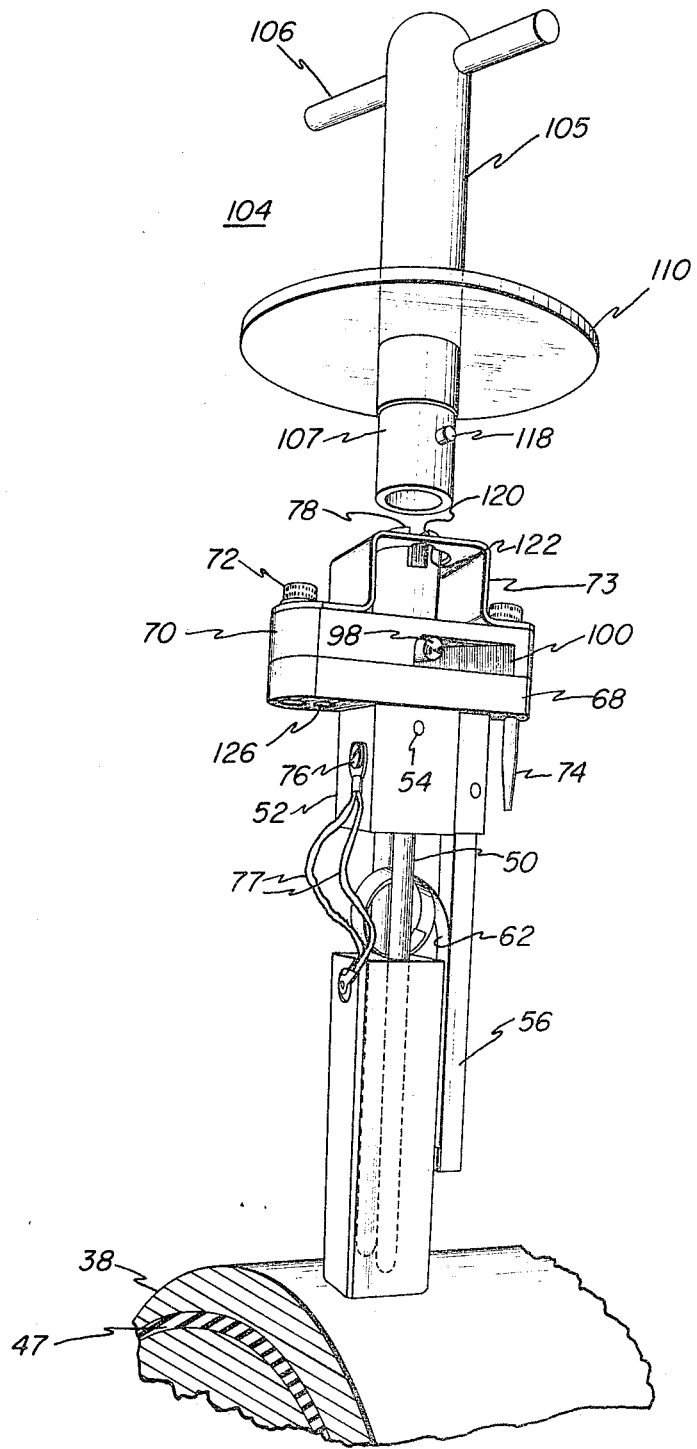
FIG. 4 is a perspective view of the brushholder assembly and associated brush with the removable handle shown detached.

The brushholder assembly 42, a preferred embodiment of which is shown in detail in FIGS. 2, 3, and 4, includes a pair of substantially parallel elongated members or cylindrical brush pins 50 received in openings 51 of block 52 and rigidly attached to block 52 as by pins 54. The lower portions of the brush pins 50 are slidably insertable into mating longitudinal bores 55 in a brush 40 to stably support the brush as it rides on collector ring 38. The internal support of brush 40 provided by brush pins 50, unlike the box-like external support of prior art devices, leaves the side surface (typically four rectangular sides) of the brush freely exposed to cooling gas circulating near the brush, thus greatly improving convective heat transfer.

A brush retaining lever 56, which may be a channel-shaped member, is pivotably connected to block 52 of the brushholder assembly 42 as by pivot pin 58 for rotation (by means described below) between a first position wherein the lever is out of contact with the brush 40 supported by the brushholder assembly 42, and a second position (shown by the broken line of FIG. 2) such that the free end of lever 56 bears against and engages a side of the brush 40 permitting retention of the brush 40 by the brushholder assembly 42 during their insertion into or removal from a suitable opening 60 in casing 48. A coil spring 62 may also be attached to the free end of lever 56 as by rivets 64, the spring providing, as is known in the art, a force to bias the brush 40 against collector ring 38, and accommodating changes in height of brush 40 due to wear.

Also as shown in FIGS. 2, 3, and 4, mounted on top of block 52 of brushholder assembly 42 and rigidly attached thereto as by a pair of countersunk screws 66 is lower body member 68. Lower body member 68 in turn is attached to an upper body member 70 by a pair of screws 72, which also fasten a cap 73 to upper body member 70. Lower body member 68 may include a pair of locating pins 74 receivable in mating holes (not shown) in casing 48; the locating pins 74 assist in correctly orienting the brushholder assembly 42 during insertion thereof into casing 48.

Block 52 also includes means such as threaded hole 75 and mating bolt 76 for attaching a flexible lead or pair of leads 77 from the brush 40 to the brushholder assembly 42 to ensure a proper electrical connection between brush 40 and brushholder assembly 42.

The upper portion of brushholder assembly 42 carries a rotatable rod 78 which includes an upper cylindrical section passing through an opening 79 in cap 73 (see FIGS. 2 and 5) and bore 80 of upper body member 70, and a lower cylindrical section of smaller diameter passing through bore 82 of lower body member 68 and received in bore 84 of block 52. The lower section of rod 78 is provided with a cam portion 86 which bears against one end of a pin 88 located in recess 90 of block 52. The other end of pin 88 contacts the side of brush retaining lever 56 so that rotation of the cam portion 86 of rod 78 causes lateral movement of pin 88 and in turn rotation of brush retaining lever 56 about pivot pin 58 from a first position wherein lever 56 is out of contact with brush 40 to a second position wherein the lower end of lever 56 engages a side of the brush 40. A spring 94 in bore 96 of block 52 bears against the side of lever 56 below pivot pin 58 to provide a restoring moment to maintain contact between pin 88 and lever 56 and to urge lever 56 back to its first position out of contact with brush 40 as rod 78 is returned to its initial position.

Surrounding the section of rod 78 passing through lower body member 68 are a plurality of Belleville washers 97 which bear against the collar of rod 78 formed at the intersection between upper and lower sections of rod 78 and which permit small axial deflections of rod 78 during installation of brushholder assembly 42 into casing 48 and removal therefrom.

Figure 5:
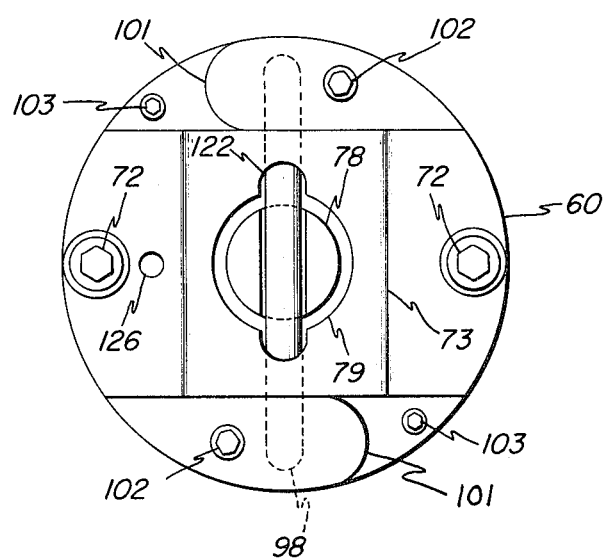
FIGS. 5 and 6 are, respectively, top and side views of the brushholder assembly showing a preferred arrangement for attaching it to the casing which supports the assembly.
Figure 6:
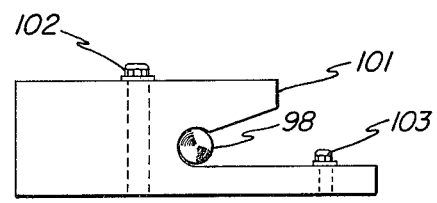

A locking pin 98 extends from the upper section of rod 78 through a pair of slots 100 on opposite sides of upper body member 70, each slot 100 having essentially the shape of a right triangle to permit a limited amount of rotation of locking pin 98 as rod 78 is rotated. As shown in FIGS. 5 and 6, top and side views respectively of brushholder assembly 42 installed within an opening 60 of casing 48, a pair of ears 101 are attached to a shoulder of casing 48 (not shown) within opening 60 as by bolts 102 and 103. Ears 101 form a pair of recesses for receiving locking pin 98 and thus locking brushholder assembly 42 to casing 48.

To facilitate insertion of the brushholder assembly 42 and its associated brush 40 into casing 48 and removal therefrom, a detachable handle 104 is provided. At least the upper portion of handle 104 is insulated from brushholder assembly 42 to allow inspection and replacement of worn brushes during operation of the dynamoelectric machine without risk of electrical hazards. In the embodiment shown in FIGS. 3 and 4, the handle 104 includes an upper shaft 105 and cross member 106, both of non-metallic or electrically non-conductive material, a lower shaft 107 which is held within upper shaft 105 as by pin 108, and a transparent guard disk 110 attached to lower shaft 107. Below guard disk 110, lower shaft 107 includes a bore 112 slidably receiving spring 114 and washer 116, which, when handle 104 is out of contact with assembly 42, are retained within bore 112 by a cross pin 118. Cross pin 118 is dimensioned to fit within recess 120 of rotatable rod 78 of brush-holder assembly 42 and to pass through the cutout 122 of cap 73 (see FIG. 5) when handle 104 and rod 78 are depressed with rod 78 in its first or locked position as shown in FIG. 5 (i.e., cutout 122 and recess 120 are aligned).

Since the casing 48 renders direct visual inspection of brush wear difficult without removal of the brushholder assembly 42 from casing 48, it is desirable to attach a wear indicator or scale 124 to each brush (see FIG. 2) and provide an access port 126 in body members 68 and 70 so that wear indicator 124 may pass through brushholder assembly 42 and be viewed from outside of casing 48.

Operation of the invention is as follows. To remove the brushholder assembly 42 and brush 40 from the casing 48, handle 104 is inserted into recess 120 of rotatable rod 78 of brushholder assembly 42 and downward pressure is applied to rod 78 by contact between the top of rod 78 and washer 118 of handle 104. This compresses spring 114 and washers 97 and allows cross pin 118 to pass through the cutout 122 of cap 73. Handle 104 is then rotated approximately 45° until rotation is stopped by contact between locking pin 98 and the sides of slots 100 of upper body member 70. Rotation of handle 104 and rod 78 locks handle 104 and brushholder assembly 42 together by trapping cross pin 118 under cap 73, against which cross pin 118 is held firmly by forces from spring 114 and washers 97. Rotation of handle 104 also unlocks brushholder assembly 42 from the casing 48 by disengaging locking pin 98 from ears 102, and moves brush retaining lever 56 into firm contact with brush 40. At this point handle 104, brushholder assembly 42, and brush 40 may be lifted together as a unit out of casing 48. The brush 40 may then be removed from brushholder assembly 42, if desired, by turning handle 104. A new brush may be locked into position, and the remaining above steps reversed to install the brushholder assembly 42 and brush into operative position.

It will be appreciated that apparatus including a brushholder assembly, casing, and removable handle has been described which will facilitate transfer of heat away from brushes and collector ring of a dynamoelectric machine and will readily permit brush maintenance operations while the machine is in operation. In tests of a preferred arrangement of apparatus as described herein, a reduction of approximately one quarter of maximum average brush operating temperature was achieved, and useful life of the brushes was increased by a factor of about two.

While there has been shown and described a preferred embodiment of the invention, it is understood that various other modifications may be made therein. For example, although the apparatus is described with reference to individual or single brushes, it may readily be applied to "gang" or "magazine" brushholder arrangements as described in the above-cited U.S. Pat. No. 3,387,155 to Krulls. Also, other means for mounting the brushes in an enclosed or semi-enclosed area and with substantially all of their side surfaces exposed for effective heat transfer may occur to those of ordinary skill who are cognizant of the present invention. It is intended to claim all such modifications which fall within the true spirit and scope of the present invention.

What is claimed is:

1. Apparatus for supporting and manipulating an electrically conductive brush to facilitate an exchange of current between the rotating collector ring of the rotor of a dynamoelectric machine and the conductive brush, comprising:

a brushholder assembly having a pair of elongated members for insertion into longitudinal bores in the brush so that the brush is slidably supported and substantially all of the side surface area of the brush is exposed for unimpeded heat transfer with cooling gas near the brush; and retaining means comprising an open-ended casing concentric with the collector ring and disposed radially outward thereof to removably retain said brushholder in position for directing cooling gas flow between the collector ring and casing to pass over the surface of the brush.

2. The apparatus of claim 1 further including a fan mounted on the dynamoelectric machine rotor, said fan having a gas intake coupled to one end of said open-ended casing to circulate cooling gas near the brush and said collector ring.

3. The apparatus of claim 2 wherein said brushholder assembly includes a brush retaining lever pivotably connected to the assembly and rotatable between a first position wherein the lever is out of contact with the brush and a second position wherein said lever bears against and engages the brush for retention of the brush in the brushholder assembly during insertion of said assembly into said casing and removal therefrom.

4. The apparatus of claim 3 wherein said brushholder assembly includes a spring operatively disposed between said brush retaining lever and the brush to bias the brush into contact with said collector ring.

5. Apparatus for supporting and manipulating an electrically conductive brush to facilitate an exchange of current between the rotating collector ring of the rotor of a dynamoelectric machine and the conductive brush, said apparatus comprising:

a brushholder assembly having a pair of elongated members for insertion into longitudinal bores in the brush so that the brush is slidably supported and substantially all of the side surface area of the brush is exposed for unimpeded heat transfer with cooling gas near the brush, a pivotable brush retaining lever rotatable between a first position wherein said lever is out of contact with the brush and a second position wherein said lever bears against and engages the brush for retention of the brushholder assembly during installation and removal operations, and a spring operatively disposed between said brush retaining lever and the brush to bias the brush into contact with the collector ring;

an open-ended casing outwardly concentric with the collector ring for removably retaining said brushholder assembly in position for directing cooling gas over the surface of the brush;

means for locking said brushholder assembly to said casing, said locking means comprising a rotatable rod mounted on said brushholder assembly, a locking pin extending through said rod substantially at right angles to the axis of said rod, and an ear attached to said casing and forming a recess for receiving said locking pin when said rod is rotated to a locking position; and a fan mounted on the dynamoelectric machine rotor, said fan coupled to one end of said casing to circulate cooling gas near the brush and collector ring.

6. The apparatus of claim 5 further including a brush wear indicator wherein said wear indicator comprises a graduated distance scale having one end attached to the brush and movable therewith to indicate brush wear.

* * * * *